Feb. 23, 1937. H. CORY 2,071,919
VACUUM COFFEE BREWER
Filed July 13, 1934
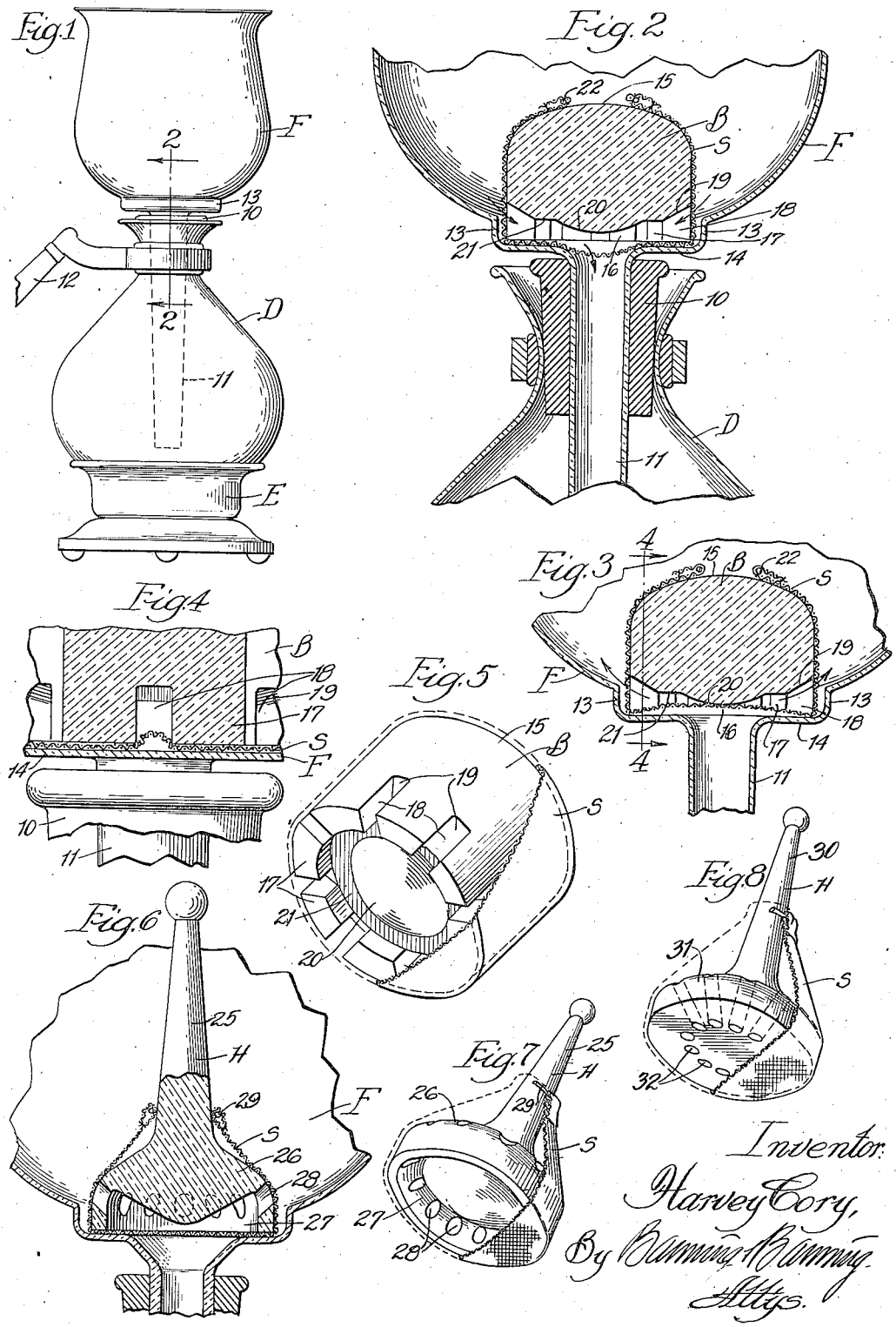

Patented Feb. 23, 1937

2,071,919

UNITED STATES PATENT OFFICE 2,071,919

VACUUM COFFEE BREWER

Harvey Cory, Chicago, Ill.

Application July 13, 1934, Serial No. 734,893

6 Claims. (Cl. 53—3)

This invention relates generally to a coffee brewing utensil of the vacuum type in which is included two vessels, one a decanter and the other a funnel, the latter having a tubular stem depending into the decanter for sealed connection therewith. More particularly, the present improvements are directed (1) to a filtering unit disposed within the funnel adjacent its base for straining fluid passing into the decanter from the funnel, and (2) to a method employed by which a superior coffee brew is obtained in a lesser period of time.

It is an object of my invention to devise for the purposes noted a filter device which is simple in the extreme, inexpensive to produce, easy to clean, and otherwise readily adaptable to meet the needs of a vacuum coffee brewer. My improved filter, together with the holder or mounting therefor, meets all these requirements, is easily removable, upon occasion, is devoid of metal parts which might be considered objectionable, and provides a strainer element which will not readily clog, which offers little or no assistance to upflow of air, steam and water, and which may be readily cleaned, removed, or replaced.

It is also an object of my invention to provide an apparatus in which may be carried on the brewing of coffee by a novel process having for its objective the production of a coffee which is of improved taste and flavor and which requires a lesser time for its brewing.

These and other objects of my invention are realized by the construction which is herein shown and described, certain suggestive embodiments whereof are illustrated in the accompanying drawing wherein—

Figure 1 is a side elevation of a vacuum coffee brewer adapted to receive my improved filter unit;

Figure 2 is a central longitudinal section through the filter unit and fragments of adjacent parts, showing the inactive position of the strainer;

Figure 3, which is a similar view, shows the bottom portion of the strainer as when raised in response to pressure of air, steam or water;

Figure 4 is a detail in vertical section taken on line 4—4 of Figure 3 showing the strainer bottom lifted, as in Figure 3;

Figure 5 is a perspective view of the filter unit per se;

Figure 6 is a view similar to Figure 2 showing a filter unit of slightly modified construction;

Figure 7 is a perspective view of the filter per se; and

Figure 8, which is a similar view, shows a slightly modified construction of holder or mounting for the strainer material.

The coffee brewer illustrated, which is of the vacuum type, comprises a decanter D adapted to be rested upon or over a heater E. Fitted within the neck of the decanter is a bushing 10 through which is extended a tubular stem 11 depending from a funnel F. A handle 12 may be connected to the neck of the decanter, as is usual.

The funnel stem which is open at its lower end extends downwardly into the decanter close to the bottom thereof. The base of the funnel is desirably provided with an annular wall 13 forming a shoulder from which extends inwardly a ring-shaped wall 14 forming a seat. It will be understood that the decanter may be made of heat-proof glass in one piece, and that the funnel with its depending stem may also be produced in the same way of like material.

Formed to rest upon the seat of the funnel is my improved filter unit which comprises a generally cylindrical block B over which is fitted a strainer S. The block which is desirably made of heat-proof glass cast in one piece may be formed with a dome top 15. On its under face the block is recessed to provide a chamber 16 surrounded by an annular wall 17 forming a depending base which is in flush and in continuous relation with the upper cylindrical contour of the block. Through this annular wall are provided a plurality of lateral ports in the form of radial slots 18, each opening on to the lower face of the base. The roof 19 of each port may be slanted upwardly and outwardly to extend its side opening to an elevated point. The roof of the chamber within the block is provided centrally with a reentrant dome 20 depending thereinto somewhat as shown in Figures 2, 3 and 5. The diameter of this dome is somewhat less than that of the chamber so as to leave between itself and the annular base wall an annular roof portion 21.

The strainer S may conveniently consist of a bag of appropriate fabric material which is both flexible and absorbent. A draw string 22 surrounds the neck of the bag which is adapted to be fitted around and partially over the block. The draw string may accordingly close the open end of the bag upon the dome top of the block, thereby securing the bag in place. When so positioned, the bag covers the exterior of the block and extends across the open bottom thereof so as to close off the chamber therewithin.

The filter unit is of such size and shape as to be receivable upon the seat 14 in slightly spaced relation to the surrounding shoulder 13. It will be noted that the lower face of the block base is rested upon the underlying thickness of the strainer material which, in turn, is supported upon the seat. Such a construction makes for a closer and tighter connection between the filter unit and its seat, both of which parts are, in commercial practice, often slightly uneven and irregular.

A modified filter unit, differing only slightly in construction, is suggested in Figures 6 and 7. As shown, this consists of a holder H over which is fitted a strainer S. The holder comprises a vertically extending stem 25 joined at its lower end to a block in the general form of a bell-shaped head 26 having therein a chamber 27 which is open upon the lower face of the head. The dome of this chamber is preferably re-entrant to provide a central deflecting surface. Ports 28 extend through the lateral wall of the head affording communication from inside the chamber to the exterior of the holder. Glass or other suitable material may conveniently be utilized for the holder which is readily producible in one piece by a molding operation. Over the bell-shaped head is applied the strainer whose draw string 29 may be tightened around the stem of the holder, as shown. When so positioned, the strainer covers the exterior of the bell-shaped head of the holder and extends also across the open bottom thereof so as to close off the chamber therewithin.

The filter unit comprised in Figure 8 is generally similar to the one last described, in that it comprises a stem 30 extending upwardly from a bell-shaped head 31. The strainer S which is in the form of a bag is applied over the head of the holder in the same manner as has already been described. The base of the head, however, is not chambered, as is the construction elsewhere, but remains as a plain surface requiring certain ports 32 to be extended obliquely through from the under face to the side of the head at a point which is desirably above the upper edge of the shoulder 13.

In operation, water is placed in the decanter, the funnel is fitted into position, and the filter unit with strainer attached is then rested in position upon its seat. Fresh roasted coffee, which is preferably pulverized so as to facilitate extraction of the aromatic oils from its cells, is poured into the funnel to the desired amount. Upon heating the water in the decanter, a pressure of air or steam is developed which is directed against the strainer element. Initially the strainer is positioned somewhat as indicated in Figure 1 evenly upon the seat and in spaced relation to the re-entrant dome within the block chamber. In response to the pressure of air and steam which is followed by an upflow of water, the strainer tends to rise from off its seat within the confines of each of the slots 18, as indicated in Figure 4. When so disposed, the strainer offers little or no resistance to the escape of air and steam. Water is then free to pass upwardly out from the decanter below the strainer and through the lateral ports into the funnel to produce an infusion. In effect, this provides a bypass for the free upward flow of the water. When substantially all the water in the decanter has passed into the funnel, the heat is shut off, and with consequent cooling of the decanter a vacuum or minus pressure is produced which draws the infusion back from the funnel. In this return or downflow, the infusion is required to pass through the strainer before entering the decanter. During this stage of the operation, the strainer is drawn down tightly upon the filter seat so as to close the openings through which the liquid passed while upflowing. A continuous seal at all points is thereby assured so that, on the down movement of the infusion, coffee grounds or other particles are caught and held by the strainer.

With the filter unit of my invention, the strainer offers little or no resistance to the upward flow of the liquid, due to the raising of the strainer within the confines of the radial slots to open up lateral passages for the liquid. On the return or downflow, the strainer becomes fully effective withal offering only a minimum of resistance due in part to the large area of the ported openings through which the liquid passes and to the large area of the strainer surface through which the liquid is drawn. In addition, the strainer, which may desirably be made of a woven textile material, performs a filtering action at two points, once at the sides of the block and once again below its bottom. The space between these two thicknesses of strainer material is ample to catch any coffee particles which may possibly pass through the interstices of the strainer. In such event, the few loose grounds may subsequently be removed by taking off and cleansing the strainer bag. During the stage of upflow, the re-entrant dome acts to deflect the water and steam outwardly, as do also the slanted roofs of the radial slots which open out upon the sides of the block at a point desirably above the shoulder 13. Resistance to movement of the liquid in either direction is thereby reduced to a minimum. Because of the bag form of the strainer and of its smooth fit upon the block, I avoid wrinkles and puckers of the material, thereby facilitating ready passage of the fluid therethrough, so that the entire brewing operation is susceptible of performance in a minimum of time.

It is desirable that the block or holder comprised in the filter unit be of substantial weight.
For a funnel having a stem with inside diameter of about 1⅜ths of an inch, the block may be approximately 2¾₆ inches in diameter with a weight of six ounces or more. By so relating the factors of filter unit weight and diameter to the funnel seat and stem, I am able to attain very superior results. This comes about, in part, through the capacity of the strainer material to rise in the slots (see Figure 4) in response to the pressure of air and steam which is driven from the water in the decanter in the earlier stages of the brewing operation. The air and steam are accordingly free to escape, thereby relieving the decanter of back pressure up to a point where the temperature of the water reaches 150° F. or thereabouts. This is in marked contrast with the usual types of vacuum coffee brewers wherein a back pressure is built up commencing with a water temperature of around 90° F.

A further element which contributes to the absence of back pressure is the weight of the filter unit in relation to the size of the funnel seat and stem with which it co-operates. As already suggested, this weight should be substantial, but not so great but that the block may, if necessary, rise slightly to permit escape of the larger bubbles of air given off during a later stage in the brewing operation. If and when the block is so moved, it will only be after some water has been transferred upwardly into the funnel. Accordingly the coffee particles in the funnel will be floated on the water so as to be prevented from dropping down past the filter unit to enter the decanter. By providing for the relief of initial pressure within the decanter, I delay the upflow of water therefrom until a temperature of around 150° F. has been reached. The infusion will accordingly start at or about such a temperature. It will continue until the water reaches the maximum temperature of around 203° F., requiring but two minutes or so. This brief but effective period of infusion which is confined to the higher temperatures is a very potent factor in producing a coffee brew having a distinctly superior and improved flavor.

A further feature of advantage resides in the use of the present strainer which extends vertically and upwardly along the block or holder of the filter unit for a substantial distance. Having completed the infusion, the strainer is required to function while the brew descends into the decanter. At this stage of the operation, it will be found that the present strainer operates effectively to hold back the coffee particles while permitting the filtered liquid to pass rapidly through to the decanter below. This movement of the liquid through the strainer proceeds both transversely and longitudinally thereof. The liquid passes transversely through the strainer at points opposite the several ports and over the upper end of the funnel stem, and it also travels longitudinally through the strainer, i. e., from its upper end which is tied by the draw string down along the sides and under the block or holder. Apparently a capillary action, much like that of a wick feed, is what takes place. Accordingly, the capacity of the strainer is much increased, as is also the speed with which it functions to permit the liquid to pass therethrough, while still holding back the coffee particles that are to be strained. This reduction in the time of filtering has a further effect of improving the quality of the coffee brew, because after the infusion is completed best results require separation of the coffee particles from the liquid in as short a space of time as possible. So far as I am aware, there is no strainer element yet devised for a vacuum coffee brewer which will operate as speedily as the one herein described.

The resulting brew is what may be termed a true coffee infusion in that it is not contaminated with derivatives of metals or other materials which are wholly absent from inside the decanter and funnel. The brew is crystal clear and because of the narrow range of temperatures and brief space of time obtaining while the coffee grounds are in contact with the water, the resulting beverage is distinctly superior in flavor.

The subject matter of the invention was first disclosed in my co-pending applications Serial Nos. 666,081 and 688,130, filed, respectively, on April 14, 1933, and September 5, 1933, of which the present application is a continuation in part.

I claim:

1. In a vacuum coffee brewer including a decanter to which is fitted a funnel provided with a seat, a filter unit comprising a block of substantial weight adapted for loose fitting within the seat, the under face of the block being recessed to form a chamber which is open upon the block bottom and surrounded by side walls through which are lateral ports to afford communication between the chamber and the block exterior, and strainer material applied over the block extending closely across the outer ends of the lateral ports and across the bottom faces of the side walls to span the block bottom in spaced relation to the chamber roof and inner ends of the lateral ports, the weight of the block being imposed through the bottom faces of its side walls upon the strainer material which is rested upon the seat whereby to establish, in and of itself alone, between the filter unit and the seat, a seal which is effective to prevent flow therethrough of liquid at normal operating pressures.

2. In a vacuum coffee brewer including a decanter to which is fitted a funnel provided with a seat surrounded by an annular shoulder, a filter unit comprising a block of substantial weight adapted for loose fitting within the seat, the under face of the block being recessed to form a chamber which is open upon the block bottom and surrounded by side walls through which are lateral ports extending outwardly and upwardly beyond the seat shoulder to afford communication between the chamber and the block exterior, and strainer material applied over the block extending closely across the outer ends of the lateral ports and across the bottom faces of the side walls to span the block bottom in spaced relation to the chamber roof and inner ends of the lateral ports, the weight of the block being imposed through the bottom faces of its side walls upon the strainer material which is rested upon the seat whereby to establish, in and of itself alone, between the filter unit and the seat, a seal which is effective to prevent flow therethrough of liquid at normal operating pressures.

3. In a vacuum coffee brewer including a decanter to which is fitted a funnel provided with a seat, a filter unit comprising a block of substantial weight adapted for loose fitting within the seat, the under face of the block being recessed to form a chamber which is open upon the block bottom and roofed with a re-entrant dome and surrounded by side walls through which are lateral ports to afford communication between the chamber and the block exterior, and strainer material applied over the block extending closely across the outer ends of the lateral ports and across the bottom faces of the side walls to span the block bottom in spaced relation to the chamber roof and inner ends of the lateral ports, the weight of the block being imposed through the bottom faces of its side walls upon the strainer material which is rested upon the seat whereby to establish, in and of itself alone, between the filter unit and the seat, a seal which is effective to prevent flow therethrough of liquid at normal operating pressures.

4. In a vacuum coffee brewer, the combination of two communicating vessels in sealed connection, and a filter unit interposed in the line of communication between the two vessels comprising a normally stationary rigid body with ports over which is fitted a flexible strainer means cooperating with such ports to offer a lesser resistance to the movement of fluid in one direction than the other when passing between the two vessels.

5. In a vacuum coffee brewer including a decanter to which is fitted a funnel provided with a seat, a filter unit comprising a block whose bottom end is adapted to rest within the seat, there being lateral ports open at the block bottom affording communication to a central chamber also opening on the block bottom, and a strainer element applied over the block and serving to cover its bottom and sides, the strainer element being free to rise from off the seat into the lateral ports to open passageways around the strainer in response to an upward pressure from below, the strainer element tending normally to return to its seat to close such passageways in response to an opposite pressure which causes the liquid to flow downwardly into the decanter.

6. In a vacuum coffee brewer including a decanter to which is fitted a funnel provided with a seat, a filter unit comprising a flexible strainer fitted over a block whose bottom end, together with the strainer, is loosely receivable within the seat, the block being formed centrally with a chamber opening on to its bottom and with ports also opening on to its bottom extending radially and upwardly from the chamber to open at an elevated point laterally upon the block sides permitting the strainer to flex upwardly off the seat into the ports in response to an upflow pressure of liquid passing from the decanter into the funnel whereby the liquid is free to pass under and around the strainer, the strainer tending normally to rest upon the seat whereby liquid is required to pass therethrough while downflowing from the funnel into the decanter.

HARVEY CORY.